United States Patent
Baek

(10) Patent No.: US 6,611,306 B2
(45) Date of Patent: *Aug. 26, 2003

(54) TRANSFLECTIVE LIQUID CRYSTAL DISPLAY DEVICE WITH DUAL LIQUID CRYSTAL LAYER THICKNESS AND PARTICULAR HALF WAVE PLATE ANGLE

(75) Inventor: Heum-Il Baek, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,849

(22) Filed: Apr. 17, 2001

(65) Prior Publication Data

US 2001/0048496 A1 Dec. 6, 2001

(30) Foreign Application Priority Data

Apr. 17, 2000 (KR) .......................... 2000-20117

(51) Int. Cl.[7] .............................................. G02F 1/1335
(52) U.S. Cl. .......................... 349/117; 349/113; 349/141
(58) Field of Search .......................... 349/76, 117, 119, 349/121, 114

(56) References Cited

U.S. PATENT DOCUMENTS

| | | | | |
|---|---|---|---|---|
| 6,081,312 A | * | 6/2000 | Aminaka et al. | 349/118 |
| 6,281,952 B1 | * | 8/2001 | Okamoto et al. | 349/12 |
| 2001/0052948 A1 | * | 6/2001 | Okamoto et al. | 349/12 |
| 2001/0019385 A1 | * | 12/2001 | Song et al. | 349/113 |
| 2001/0048496 A1 | * | 12/2001 | Baek | 349/114 |
| 2002/0003596 A1 | * | 1/2002 | Kim | 349/106 |
| 2002/0036732 A1 | * | 3/2002 | Kim | 349/113 |
| 2002/0054256 A1 | * | 5/2002 | Kim et al. | 349/113 |

* cited by examiner

*Primary Examiner*—Robert H. Kim
*Assistant Examiner*—Timothy L Rude
(74) *Attorney, Agent, or Firm*—Morgan, Lewis & Bockius LLP

(57) ABSTRACT

A transflective LCD device improves a light transmittance in both the transmissive mode and the reflective mode and improves efficiency in the use of the light regardless of wavelength. To properly control the ON/OFF-switch of the blue wavelength band or the red wavelength band, the transflective LCD device adopts a half wave plate ($\lambda/2$) and changes the optic axes of the polarizers and the retardation film.

14 Claims, 8 Drawing Sheets ately.
TRANSFLECTIVE LIQUID CRYSTAL DISPLAY DEVICE WITH DUAL LIQUID CRYSTAL LAYER THICKNESS AND PARTICULAR HALF WAVE PLATE ANGLE This application claims the benefit of Korean Patent Application No. 2000-20117, filed on Apr. 17, 2000, under 35 U.S.C. §119, the entirety of which is hereby incorporated by reference.

BACKGROUND OF THE INVENTION

1. Field of the invention

The present invention relates to a liquid crystal display (LCD) device, and more particularly, to a transflective LCD device that has a high brightness.

2. Description of Related Art

Until now, the cathode-ray tube (CRT) has been developed for and is used mainly for the display systems. However, the flat panel display is beginning to make its appearance due to the requirements of small depth dimensions, undesirably low weight and low voltage power supply. At present, the thin film transistor-liquid crystal display (TFT-LCD) with high resolution and small depth dimension has been developed.

During operation of the TFT-LCD, when the pixel is turned ON by the corresponding switching elements, the pixel transmits light generated from a backlight device. The switching elements are generally amorphous silicon thin film transistors (a-Si:H TFTs) which use an amorphous silicon layer. Advantageously, the amorphous silicon TFTs can be formed on low cost glass substrates using low temperature processing.

In general, the TFT-LCD transmits an image using light from the backlight device that is positioned under the TFT-LCD panel. However, the TFT-LCD only employs 3~8% of the incident light generated from the backlight device, i.e., the inefficient optical modulation.

Referring to FIGS. 1–5B, a TFT-LCD device that is manufactured by a conventional method will now be explained in some detail.

FIG. 1 is a graph illustrating a light transmittance respectively measured after light passes through each layer of a conventional liquid crystal display device. The two polarizers have a transmittance of 45% and, the two substrates have a transmittance of 94%. The TFT array and the pixel electrode have a transmittance of 65%, and the color filter has a transmittance of 27%. Therefore, the typical transmissive TFT-LCD device has a transmittance of about 7.4% as seen in FIG. 1, which shows a transmittance after light passes through each layer of the device. For this reason, the transmissive TFT-LCD device requires a high, initial brightness, thereby increasing electric power consumption of the backlight device. A relatively heavy battery is needed to supply a sufficient power to the backlight of such a device. Moreover, there still exists a problem that the battery cannot be used for a long time.

In order to overcome these problems, a reflective TFT-LCD has been developed. Since the reflective TFT-LCD device uses ambient light, it is light and easy to carry. Also, the reflective TFT-LCD device is superior in aperture ratio as compared to a transmissive TFT-LCD device. Namely, since the reflective TFT-LCD substitutes an opaque reflective electrode for a transparent electrode material in the pixel of the conventional transmissive TFT-LCD, it reflects the ambient light.

As described above, since the reflective TFT-LCD device uses ambient light other than an internal light source such as a backlight device, battery life can be increased resulting in longer use times. In other words, the reflective TFT-LCD device is driven using light reflected from the reflective electrode. Thus, only the drive circuitry that drives the liquid crystal uses the battery power in the reflective TFT-LCD device.

Additionally, the reflective TFT-LCD device has a problem that it is affected by its surroundings. For example, the brightness of indoors-ambient light differs largely from that of outdoors-ambient light. Also, even in the same location, the brightness of ambient light depends on the time of day (e.g., noon or dusk). Therefore, the reflective TFT-LCD device cannot be used at night without ambient light.

Accordingly, there is a need for a transflective TFT-LCD device that can be used during daytime hours as well as nighttime because the transflective LCD device can be changed to either a transmissive mode or a reflective mode depending on the desired condition of operation.

FIG. 2 is a schematic cross-sectional view illustrating one pixel of the transflective TFT-LCD device according to the conventional art. As shown, the transflective TFT-LCD device 51 includes a liquid crystal panel and a backlight device 70. The liquid crystal display panel includes lower and upper substrates 50 and 60 and an interposed liquid crystal layer 80. The upper and lower substrates 60 and 50 are called a color filter substrate and an array substrate, respectively.

The upper substrate 60 has color filters 61. The lower substrate 50 serves as the array substrate and includes TFTs (not shown), and transmissive and reflective electrodes 54 and 52 serve as a pixel electrode. The reflective electrode 52 surrounds the transmissive electrode 54 or has a light transmitting hole 53 having a dimension "ΔL". The reflective electrode 52 includes a conductive material such as chrome (Cr), aluminum (Al) or tantalum (Ta), which has a high optical reflectivity, and therefor reflects the ambient light 74. The transmissive electrode 54, formed in the light transmitting hole 53, transmits the light 72 emitted from the backlight device 70.

The transflective LCD device 51 is operated as follows. First, in the reflective mode, the incident light 74 from the outside is reflected from the reflective electrode 52 and is directed toward the upper substrate 60. At this time, when the electrical signals are applied to the reflective electrode 52 by the switching elements (not shown), the arrangement of the liquid crystal layer 80 varies, and thus, the reflected light of the incident light 74 is colored by the color filter 61 and is displayed as colored light. Second, in the transmissive mode, light 72 emitted from the backlight device 70 passes through the transmissive electrode 54 (or transmitting hole 53). At this time, when the electrical signals are applied to the transmissive electrode 54 by the switching elements (not shown), arrangement of the liquid crystal layer 80 varies. Thus, the light 72 passing through the liquid crystal layer 80 is colored by the color filter 61 and displayed in the form of images with other colored lights.

FIG. 3 is a cross-sectional view of the conventional transflective LCD device. In FIG. 3, the color filter is not depicted because it does not affect the polarization state of the light. As shown, the conventional transflective LCD device 110 includes a first substrate 106 (an array substrate) and a second substrate 204 (a color filter substrate). A liquid crystal layer 300 that affects the polarization state of the light according to the applied voltages is interposed between the first substrate 106 and the second substrate 204.

On the surface of the first substrate 106 that faces the second substrate 204, a TFT (not shown), a transparent conductive electrode 150 (i.e., a pixel electrode) and a reflective electrode 108 (i.e., a pixel electrode) are disposed. Lower polarizer 102 is disposed on the other surface of the first substrate 106. Moreover, a lower retardation film (quarter wave plate; QWP) 104 having a phase difference $\lambda/4$ is positioned between the first substrate 106 and the lower polarizer 102. A backlight device 101 is adjacent to the lower polarizer 102. The lower polarizer 102, the lower retardation film 104, the first substrate 106, the transparent conductive electrode 150, and the reflective electrode 108 are all together referred to as a lower substrate 100.

On one surface of the second substrate 204 is a second retardation film, i.e., Quarter Wave Plate ($\lambda/4$ plate); referred to hereinafter as a second QWP 206. On the second QWP 206 is an upper linear polarizer 208. A transparent conductive common electrode 202 is on the other surface of the second substrate 204 facing the lower substrate 100. The common electrode 202, the second substrate 204, the second QWP 206, and the upper polarizer 208 are all together referred to as an upper substrate 200.

The second QWP 206 changes the state of the light. Namely, the second QWP 206 converts the linearly polarized light into the right- or left-handed circularly polarized light, and it also converts the right- or left-handed circularly polarized light into the linearly polarized light of which polarization direction is 45° or 135°.

The polarization state of the light of the conventional transflective LCD device described above will be explained hereinafter in accordance with each layer. FIGS. 4A and 4B illustrate the state of the light from the backlight device 101 through selected components of the conventional transflective LCD device 110 of FIG. 3 when in the transmissive mode. The conventional transflective LCD device has a normally white (NW) mode, i.e., the transflective LCD device displays a white color when a signal voltage is not applied.

FIG. 4A shows the state of the light from the backlight device in the transmissive mode when a signal voltage is not applied, i.e., when the TFT is turned OFF. The light from the backlight device enters the lower polarizer 102. In this case, transmissive axis of the lower polarizer is arranged perpendicular to that of the upper polarizer 208. Only the portion of the light that is parallel with the transmissive axis of the lower polarizer 102 passes through the lower polarizer 102 as linearly polarized light of which polarization direction is 45°. The resultant linearly polarized light is converted into left-handed circularly polarized light as it passes through the first QWP 104. Then, the left-handed circularly polarized light passes through the first substrate 106 and through the transparent conductive electrode 150 without any phase shift. Next, the left-handed circularly polarized light is converted into linearly polarized light of which polarization direction is 45° as it passes through the liquid crystal layer 300, this being due to a optical retardation $\lambda/4$ of the liquid crystal layer 300. The linearly polarized light then passes through the transparent conductive common electrode 202 and through the second substrate 204. As the linearly polarized light passes through the second QWP 206, the linearly polarized light is converted into left-handed circularly polarized light. Only the portion of the left-handed circularly polarized light that is parallel with the transmissive axis of the upper polarizer 208 passes through the upper polarizer 208. That is, about 50% of the left-handed circularly polarized light can pass through the upper polarizer 208. As a result, the LCD device produces a dark gray color.

FIG. 4B shows the state of the light from the backlight device in the transmissive mode when a signal voltage is applied, i.e., the TFT is turned ON. The liquid crystal does not affect the incident light, and thus the incident light passes through the liquid crystal layer without any change of polarization state. As depicted in FIG. 4B, the light from the backlight device 101 enters the lower polarizer 102. Only the linearly polarized light of the light of which polarization direction is 45° can pass through the lower polarizer 102. The resultant linearly polarized light is converted into left-handed circularly polarized light as it passes through the first QWP 104. Then, the left-handed circularly polarized light passes through the first substrate 106, through the transparent conductive electrode 150, and through the liquid crystal layer 300 without any polarization change. The left-handed circularly polarized light also passes through the common electrode 202 and through the second substrate 204 without any change of polarization state. The left-handed circularly polarized light is then converted into linearly polarized light by the second QWP 206. The polarization direction of this linearly polarized light is 45°. Therefore, the linearly polarized light is polarized perpendicular to the transmissive axis of the upper polarizer 208 and does not pass through the upper linear polarizer 208. Thus, the LCD device produces a black color.

FIGS. 5A and 5B illustrate the polarization state of the ambient light through selected components of the conventional transflective LCD device 110 of FIG. 3 when in the reflective mode.

FIG. 5A shows the state of the ambient light in the reflective mode when a signal voltage is not applied, i.e., the TFT is turned OFF. The ambient light illuminates the upper linear polarizer 208. Only the portion of the ambient light that is parallel with the transmissive axis of the upper polarizer 208 passes through the upper polarizer 208 as linearly polarized light (135° from x-axis of reference frame). The linearly polarized light is changed into right-handed circularly polarized light by the second QWP 206 which is parallel with x-axis of the reference frame. The left-handed circularly polarized light passes through the second substrate 204 and through the common electrode 202 without any polarization change. The right-handed circularly polarized light then passes through the liquid crystal layer 300 that has optical retardation (defined by (d·Δn) hereinafter) $\lambda/4$ which is parallel with y-axis of reference frame. The right-handed circularly polarized light is then converted into linearly polarized light of which polarization direction is 135° as it passes through the liquid crystal layer 300. The linearly polarized light is then reflected by the reflective electrode 108. The reflected linearly polarized light is converted back into a right-handed circularly polarized light as it passes through the liquid crystal layer 300. The right-handed circularly polarized light is then converted into a linearly polarized light of which polarization direction is 135° as it passes through the second QWP 206. The linearly polarized light is parallel to the transmissive axis of the upper polarizer 208, and thus passes through the upper linear polarizer 208. Thus, the LCD device produces light having a white color.

FIG. 5B shows the state of the ambient light in the reflective mode when a signal voltage is applied, i.e., the TFT is turned ON. In the ON-state, the liquid crystal layer 300 does not affect polarization state of the incident light. Thus, incident light passes through the liquid crystal layer without any change of polarization state.

Accordingly, the ambient light that passes through the upper polarizer 208 as linearly polarized light is converted into right-handed circularly polarized light by the second QWP 206. The right-handed circularly polarized light passes through the second substrate 204, through the common electrode 202, and through the liquid crystal layer 300. The right-handed circularly polarized light is then reflected by the reflective electrode 108, which causes the right-handed circularly polarized light to become converted into left-handed circularly polarized light with a phase shift of 180° via a mirror effect. The left-handed circularly polarized light then passes through the liquid crystal layer 300, through the common electrode 202, and through the second substrate 204. The left-handed circularly polarized light is then converted into linearly polarized light of having a polarization direction of 45° as it passes through the second QWP 206. The linearly polarized light is perpendicular to the transmissive axis of the upper polarizer 208, and as such does not pass through the upper linear polarizer 208. Thus, the LCD device results in a black color.

As described above, the conventional transflective TFT-LCD device has both the reflective mode and the transmissive mode such that it can be used in anywhere and anytime of the day. However, referring to FIG. 4A, the LCD device produces the dark gray color, unlike the FIG. 5A, although it should display a white color when the signal voltage is not applied. This is because about 50% of right-handed circularly light having passed through the second QWP 206 only can pass through the upper polarizer 208.

Therefore, since the difference of the brightness occurs between in the reflective mode and in the transmissive mode when the TFT is turned OFF, the definition and picture quality of the transflective LCD device are lowered. Accordingly, the transflective LCD device is designed more focusing on the reflective mode and cell gaps "$d_1$" (see FIG. 3) of the reflective portion and "$d_2$" (see FIG. 3) of the transmitting portion are substantially equal. Namely, the ambient light in the reflective mode passes through the liquid crystal layer twice due to reflection of the reflective electrode, while the light from the backlight device in the transmissive mode passes through the liquid crystal layer just once. Thus, the transflective LCD device cannot produce the pure white color when the signal voltage is not applied.

Moreover, the design of the conventional transflective LCD device focuses on the way that the length of cell gap and the optic axes of other components depend on the central wavelength band of the visible light (the green wavelength band, i.e., 550 nm). Therefore, the conventional LCD device does not properly control the ON/OFF-switch of the blue wavelength band or the red wavelength band. Furthermore, both lower and upper substrates are required in the conventional LCD device.

In other words, the transmissive axis of the lower polarizer is perpendicular to that of the upper polarizer in the conventional LCD device. Moreover, if the cell gap of the LCD device is designed focusing on the green wavelength band (centered at 550 nm), the LCD device precisely transmits or shut off the green wavelength band. However, the LCD device does not transmits or shut off the other bands substantially. These limitations cause a decrease in the switching ability of the LCD device.

SUMMARY OF THE INVENTION

Accordingly, the present invention is directed to a transflective LCD device that substantially overcomes one or more of the problems due to limitations and disadvantages of the related art.

To overcome the problems described above, the present invention provides reflective, transmissive and transflective LCD devices. The present invention increases the brightness and the efficiency in the use of light from a backlight device.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, a transflective liquid crystal display (LCD) device of the present invention includes first and second substrates facing and spaced apart from each other; a first polarizer formed under the first substrate; a retardation film and a second polarizer that are formed in series on the second substrate; a backlight device being adjacent to the first polarizer; a common electrode on a surface of the second substrate facing the first substrate; a pixel electrode formed on the first substrate and corresponding to each pixel, the pixel electrode is divided into a transmissive portion and a reflective portion; a liquid crystal layer interposed between the first and second substrates, wherein a thickness of the liquid crystal layer between the common electrode and the transmissive portion of the pixel electrode is more than 1.5 and less than 2.5 times larger than a thickness of the liquid crystal layer between the common electrode and the reflective portion of the pixel electrode; and a slow axis of the retardation film is disposed at an angle "θ" from a transmissive axis of the second polarizer; and a transmissive axis of the first polarizer is disposed at the angle "2θ" from the transmissive axis of the second polarizer.

To achieve the above object, an LCD device according to the present invention includes first and second substrates facing and spaced apart from each other; a first polarizer formed under the first substrate; a retardation film and a second polarizer that are formed in series on the second substrate; a backlight device being adjacent to the first polarizer; a liquid crystal layer interposed between the first and second substrates; a common electrode on a surface of the second substrate facing the first substrate, the common electrode is formed of transparent conductive material; and a pixel electrode formed on the first substrate and corresponding to each pixel, the pixel electrode is formed of transparent conductive material; wherein a slow axis of the retardation film is disposed at an angle "θ" from a transmissive axis of the second polarizer; and wherein a transmissive axis of the first polarizer is disposed at the angle "2θ" from the transmissive axis of the second polarizer.

To achieve the above object, an LCD device according to the present invention includes first and second substrates facing and spaced apart from each other; a retardation film and a polarizer that are formed in series on the second substrate; a liquid crystal layer interposed between the first and second substrates; a common electrode on a surface of the second substrate facing the first substrate, the common electrode is formed of a transparent conductive material; a pixel electrode formed on the first substrate and corresponding to each pixel, the pixel electrode is formed of a conductive material; and a slow axis of the retardation film is disposed at an angle "θ" from a transmissive axis of the polarizer.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 6:
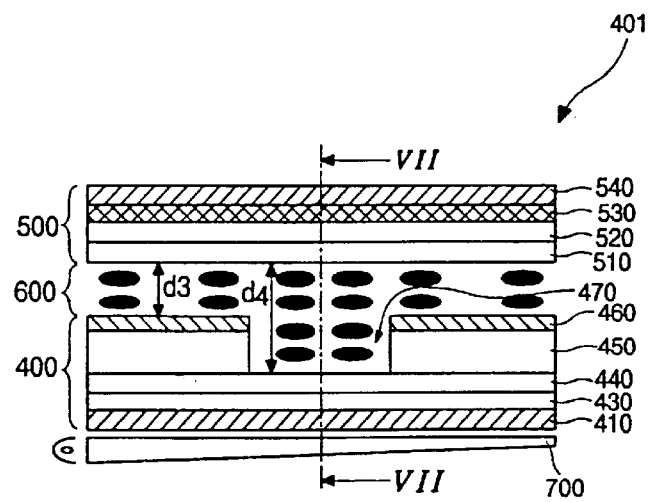
FIG. 6 is a cross-sectional view illustrating elements of the transflective LCD device according to a preferred embodiment of the present invention.

FIG. 6 is a cross-sectional view of a transflective LCD device according to an embodiment of the present invention. The color filters are not depicted in FIG. 6 because it does not affect the polarization state of the light. As shown, the transflective LCD device 401 is widely divided into a backlight device 700, an array substrate 400, a liquid crystal layer 600, and a color filter substrate 500. The liquid crystal layer 600 affecting polarization state of the light is interposed between the array substrate 400 and the color filter substrate 500. The backlight device 700 is arranged under the lower substrate 400 and emits light into the liquid crystal layer 600.

The array substrate 400 includes a lower transparent substrate 430, a lower polarizer 410, a transparent conductive electrode 440, a passivation layer 450 and a reflective electrode 460 having a transmitting hole 470. On the surface of the lower substrate 430, which faces the upper substrate 500, are disposed a TFT (not shown) and the transparent conductive electrode 440 (i.e., a pixel electrode). On the transparent conductive electrode 440 is the passivation layer 450 that has the transmitting hole 470. On the passivation layer 450 is the reflective electrode 460 that has the transmitting hole 470. Thus, the transmitting hole 470 penetrates the reflective electrode 460 (i.e., a pixel electrode) and passivation layer 450 to the transparent conductive electrode 440. In this embodiment, the transparent conductive electrode 440 and the reflective electrode 460 act together as a pixel electrode. On the other surface of the first substrate 430 is the lower polarizer 410.

The color filter substrate 500 includes a transparent common electrode 510, an upper transparent substrate 520, a half wave plate (HWP; λ/2) 530 and an upper polarizer 540. On one surface of the upper transparent substrate 520 is the HWP 530. On the HWP 530 is the upper linear polarizer 540. The common electrode 510 is formed on the other surface of the second substrate 520 facing the array substrate 400. Also, the HWP 530 acts as a retarder and causes phase difference of λ/2. The passivation layer 450 is formed in order to make different cell gaps between the pixel electrode (440 and 460) and the common electrode 510. Namely, a first cell gap "$d_3$" is defined in the interval between the reflective electrode 460 and the common electrode 510, i.e., a reflective portion. Moreover, a second cell gap "$d_4$" is defined in the interval between the transparent electrode 440 and the transparent common electrode 510, i.e., a transmitting portion. As shown, the passivation layer 450 of the array substrate 400 is formed in order to make a difference between the cell gaps "$d_3$" and "$d_4$". Thus, the thickness of the liquid crystal layer 600, i.e., the cell gaps, is different. Preferably, the second cell gap "$d_4$" is twice as long as the first cell gap "$d_3$" (i.e., $d_4=2d_3$). Although an alignment film is not depicted in FIG. 6, it can be formed between the liquid crystal layer 600 and the common and pixel electrodes.

Figure 7:
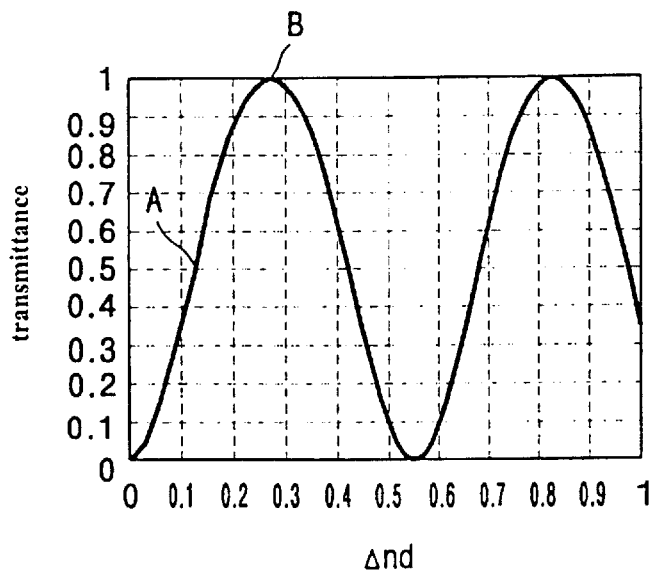
FIG. 7 is a graph illustrating the light transmittance of line VII—VII of FIG. 6 depending on the optical retardation $(d_4 \cdot \Delta n)$, as it is calculated using the Jones Matrix formulation.

FIG. 7 is a graph illustrating the light transmittance along line VII—VII of FIG. 6 depending on the optical retardation $(d_4 \cdot \Delta n)$, as it is calculated using the Jones Matrix formulation. If the first cell gap "$\Delta n \cdot d_3$" is designed to be λ/4 (λ=550 nm), the second cell gap "$d_4$" is equal to the first cell gap "$d_3$" ($d_4=d_3$) in a portion "A" while the second cell gap "$d_4$" is twice as large as the first cell gap "$d_3$" ($d_4=2d_3$) in a portion "B". Namely, as shown in FIG. 7, the transmittance is theoretically 100% in the portion "B" in which the thickness of the second cell gap "$d_4$" is twice as large as that of the first cell gap "$d_3$".

Figure 1:
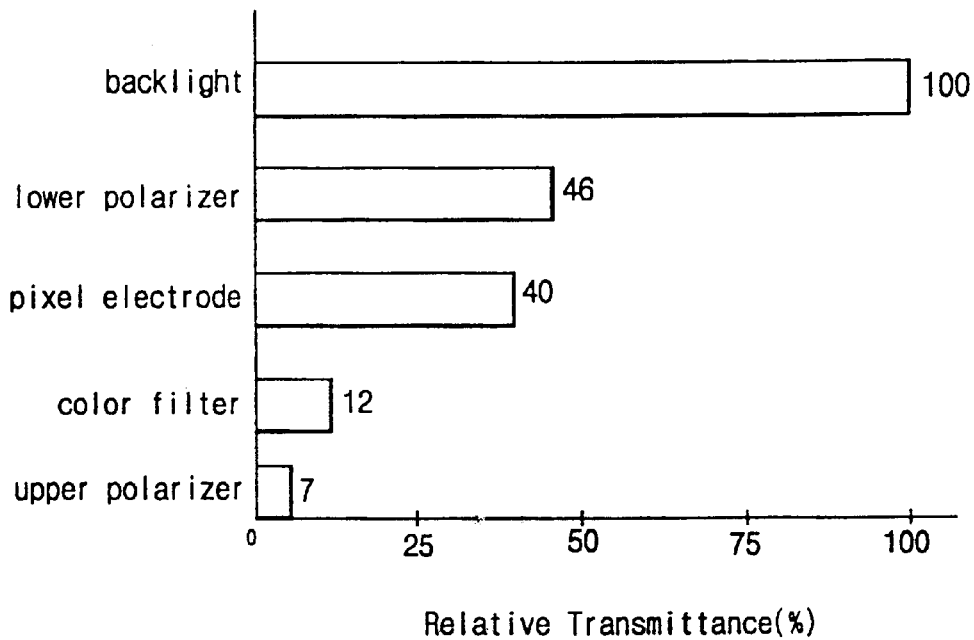
FIG. 1 is a graph illustrating a relative transmittance respectively measured after light passes through each layers of a conventional liquid crystal display (LCD) device.
Figure 2:
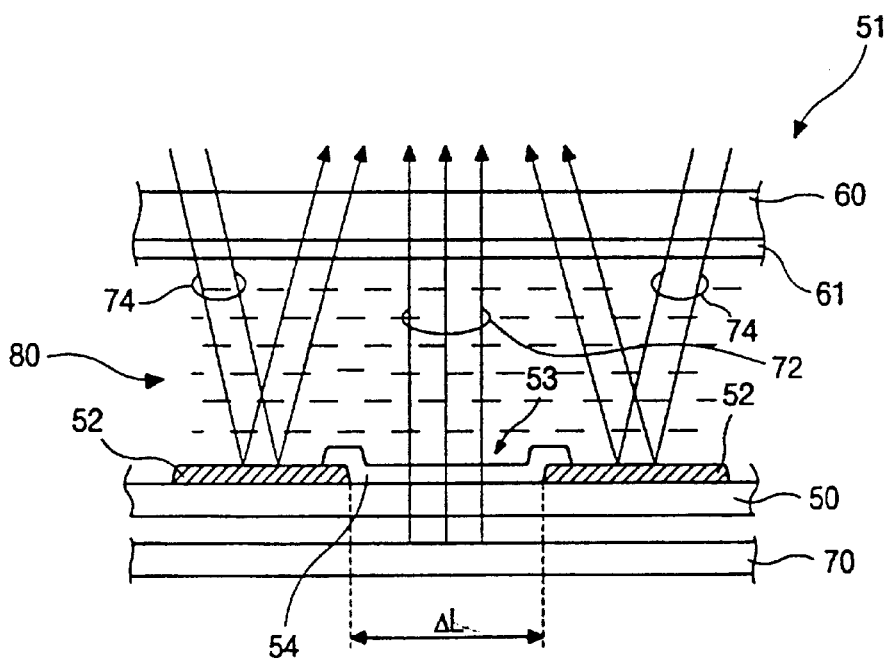
FIG. 2 is a cross-sectional view illustrating a typical transflective LCD device.
Figure 3:
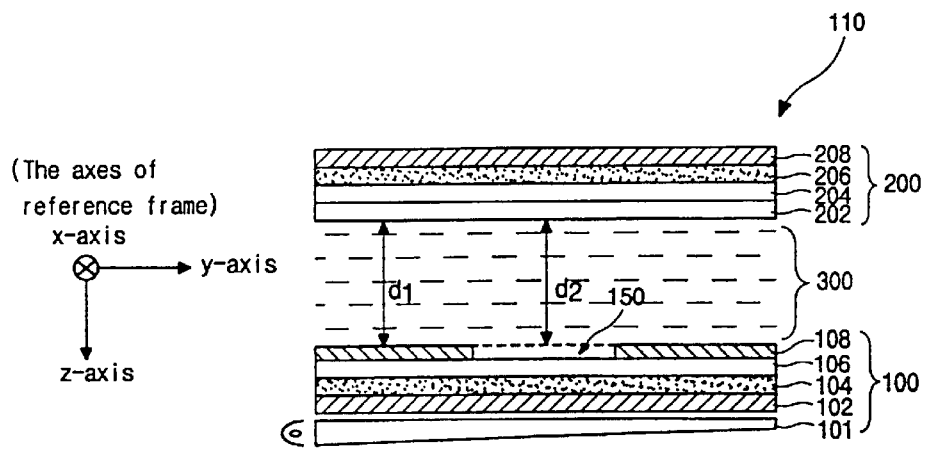
FIG. 3 is a cross-sectional view illustrating elements of the transflective LCD device according to the conventional art.
Figure 4A:
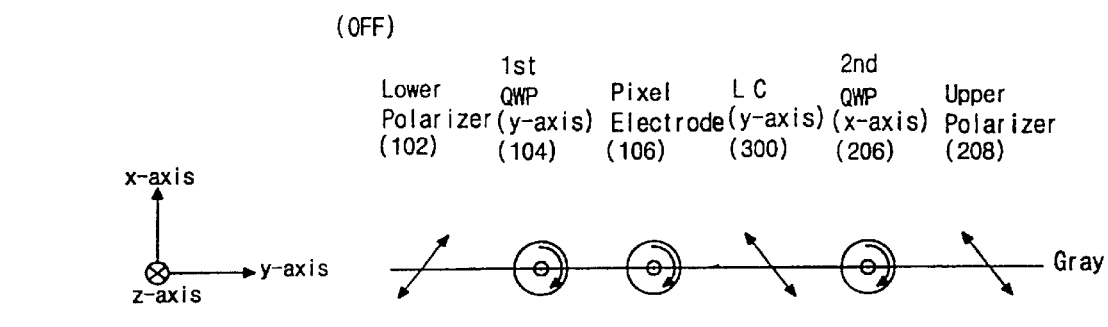
FIGS. 4A and 4B are views illustrating the state of light from a backlight device passing through components of the transflective LCD device of FIG. 3 when it is operating in a transmissive mode.
Figure 4B:
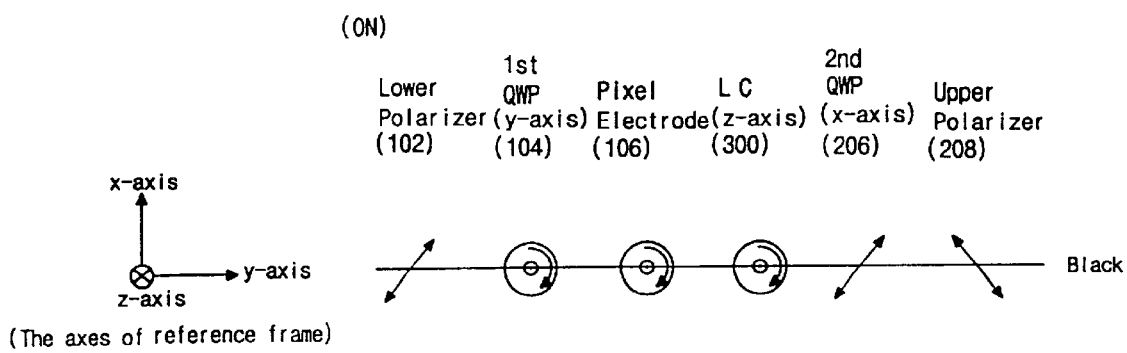
Figure 5A:
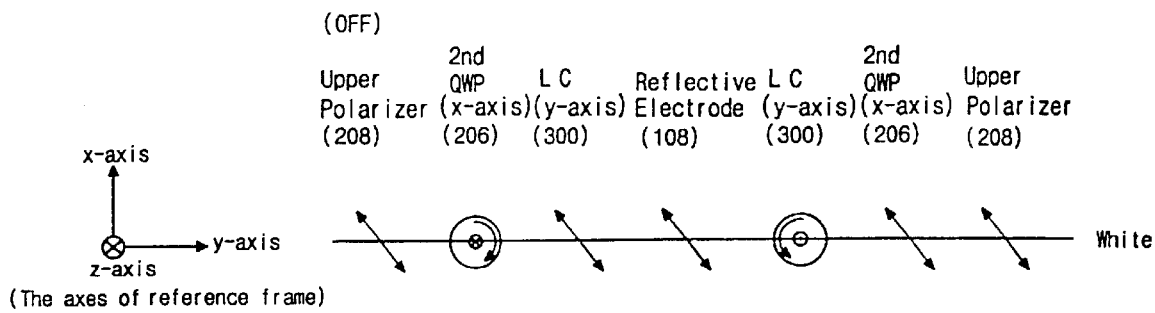
FIGS. 5A and 5B are views illustrating the state of ambient light passing through components of the transflective LCD device of FIG. 3 when it is operating in a reflective mode.
Figure 5B:
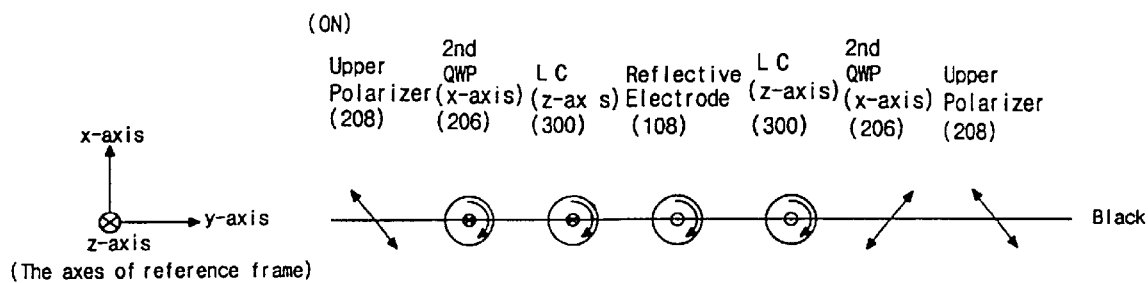

Referring back to FIG. 4A, the light after passing through the second QWP 206 is the left-handed circularly polarized light in the transmissive mode of the conventional transflective LCD device. Thus, about 50% of the right-handed circularly polarized light that is parallel with the transmissive axis of the upper polarizer 208 can pass through the upper polarizer 208.

However, according to the principles of the present invention, the light passing through the retardation film (HWP) 530 (see FIG. 6) is converted into linearly polarized light. Referring to FIG. 6, the liquid crystal layer 600 acts like the quarter wave plate, which has a phase difference of λ/4, in an OFF-state in the reflective portion. As a result, if the second cell gap "$d_4$" is twice as large as the first cell gap "$d_3$", the liquid crystal layer 600 has a phase difference of λ/2 in the transmitting portion when the TFT is turned OFF. For more a detailed explanation, the relation between the cell gap and the optical retardation of the liquid crystal layer can be calculated by the following equations.

$$\Delta n \cdot d_3 = \lambda/4 \text{ (in the reflective mode)} \quad (1)$$

$$\therefore d_4 = 2\, d_3$$

$$\Delta n \cdot d_4 = \lambda/2 \text{ (in the transmissive mode)} \quad (2)$$

Figure 8A:
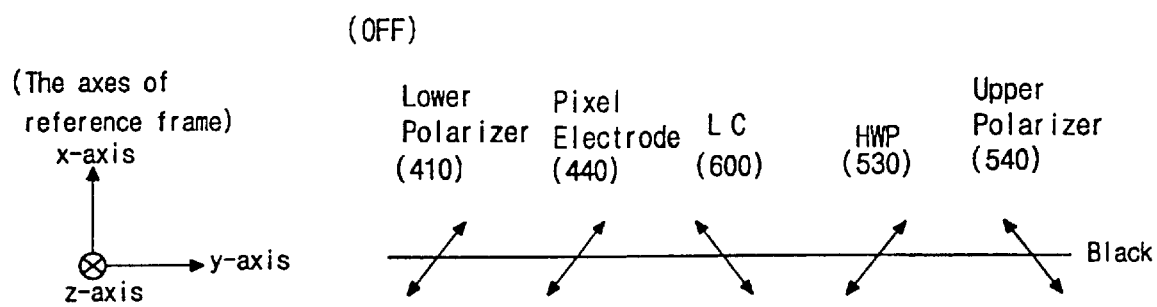
FIGS. 8A and 8B show the polarization state of the light from the backlight device in the transmissive mode depending of whether a signal voltage is applied or not.

FIG. 8A shows the polarization state of the light from the backlight device in the transmissive mode when a signal voltage is not applied, i.e., the TFT is turned OFF. The light from the backlight device enters the lower polarizer 410. Only the portion of the light that is parallel with the transmissive axis of the lower polarizer 410 passes through the lower polarizer 410 as linearly polarized light of which polarization direction is 45° from x-axis of reference frame. The resultant linearly polarized light passes through the lower transparent substrate 430 and through the transparent conductive electrode 440 (i.e., the pixel electrode). Then, the linearly polarized light is converted into another linearly polarized light having polarization direction of 135° from the x-axis of the reference frame as it passes through the liquid crystal layer 600. This results from the liquid crystal layer 600 having the optical retardation $\lambda/2$. The linearly polarized light then passes through the transparent common electrode 510 and through the upper transparent substrate 520. As the linearly polarized light passes through the HWP 530 that has the optical retardation $\lambda/2$, the linearly polarized light having polarization direction of 135° from the x-axis of the reference frame is converted into linearly polarized light of which polarization direction is 45° from x-axis of reference frame. This linearly polarized light is polarized perpendicular to the transmissive axis of the upper polarizer 540, and therefore, does not pass through the upper linear polarizer 540. Thus, the LCD device produces a black color. Namely, the transflective LCD device according to the principles of the present invention has a normally black (NB) mode, i.e., the transflective LCD device displays a black color when a signal voltage is not applied.

Figure 8B:
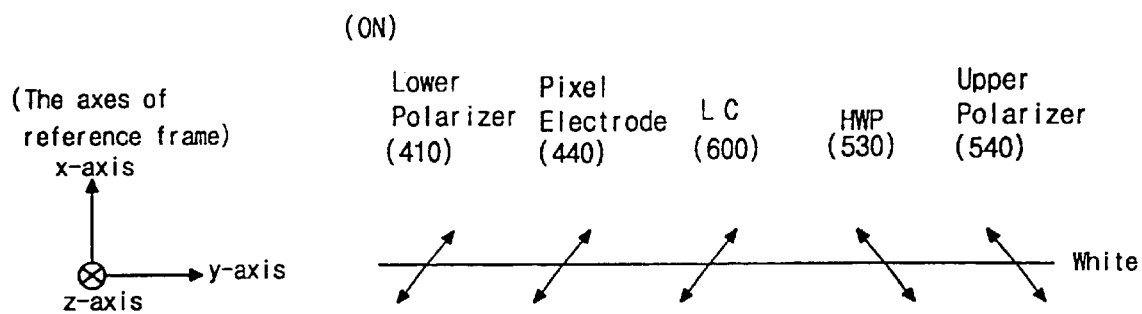

FIG. 8B shows the polarization state of the light from the backlight device in the transmissive mode when a signal voltage is applied, i.e., the TFT is turned ON. The light from the backlight device enters the lower polarizer 410. Only the portion of the light that is parallel with the transmissive axis of the lower polarizer 410 passes through the lower polarizer 410 as linearly polarized light of which polarization direction is 45° from x-axis of reference frame. The resultant linearly polarized light passes through the lower transparent substrate 430, through the transparent conductive electrode 440 (i.e., the pixel electrode), and through the transmitting hole 470. When the linearly polarized light passes through the liquid crystal layer 600, it is not converted and polarized any more because the liquid crystal layer 600 ideally does not have the optical retardation in the ON-state. The linearly polarized light having polarization direction of 45° then passes through the transparent common electrode 510 and through the upper transparent substrate 520. As the linearly polarized light passes through the HWP 530 that has the optical retardation of $\lambda/2$, the linearly polarized light having polarization direction of 45° from the x-axis of the reference frame is converted into linearly polarized light of which polarization direction is 135° from x-axis of reference frame. The linearly polarized light is polarized parallel with the transmissive axis of the upper polarizer 540, and thus passes through the upper linear polarizer 540. Thus, the LCD device produces a white color.

Although the reflective mode is not depicted in the drawings, the LCD device is completely dark when the TFT is turned OFF, and absolutely bright when the TFT is turned ON.

As mentioned before, the optical retardation of the HWP is $\lambda/2$ ($\lambda$=550 nm), the optical retardation of the liquid crystal layer is $\lambda/2$ ($\lambda$=550 nm) in the transmissive mode, and the optical retardation of the liquid crystal layer is $\lambda/4$ ($\lambda$=550 nm) in the reflective mode. However, these optical retardations are ideal values. Namely, when fabricating the LCD device in practice, these optical retardations vary within the scope of the way that does not largely affect the optical effect and efficiency of the LCD device. For example, referring back to FIG. 7, the optical retardation of the liquid crystal layer in the transmissive mode is not precisely $\lambda/2$ (at $\lambda$=550 nm), i.e., 275 nm. Namely, when the optical retardation ranges from 250 nm to 300 nm, the decrease of the transmittance is less than 3% of the maximum value. This decreased transmittance is an allowable value in practice. In view of aforementioned example, the optical retardation of the liquid crystal layer in the reflective mode ranges from 110 nm to 160 nm instead of the precise optical retardation of $\lambda/4$ (at $\lambda$=550 nm), i.e., 137.5 nm. From these examples, the optical retardation of the HWP ranges from 250 nm to 300 nm.

The embodiment described above is just one exemplary and explanatory in the case of a homogeneous alignment layer LCD device. However, if an LCD device included homeotropic alignment layers, the homeotropic alignment layer LCD device produces the opposite results from the above-mentioned homogeneous alignment layer LCD device. Namely, even though the homeotropic alignment layer LCD device has the aforementioned structure and configuration, the homeotropic alignment layer LCD device produces a white state when the TFT is turned OFF and the LCD device produces a black state when the TFT is turned ON. Moreover, a negative type liquid crystal that has a negative dielectric constant is required for the homeotropic alignment layer LCD device.

As described above, the present invention adopts the HWP instead of the pair of QWPs. In contrast, the conventional art uses two QWPs in the upper and lower substrates, respectively. However, the present invention only uses one HWP in the upper substrate. Thus, the structure of the present invention reduces the number of components in the LCD device, thereby decreasing manufacturing cost.

Another embodiment of the present invention will now be explained hereinafter. By re-arranging the optical directions of elements of the LCD device, the transflective LCD device can achieve high efficiency in switching broad-band wavelengths of the light.

Figure 9A:
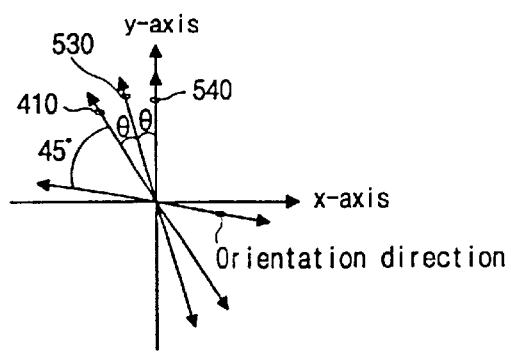
FIGS. 9A and 9B show a positional relationship of the LCD device elements of FIG. 6 according to another embodiment.
Figure 9B:
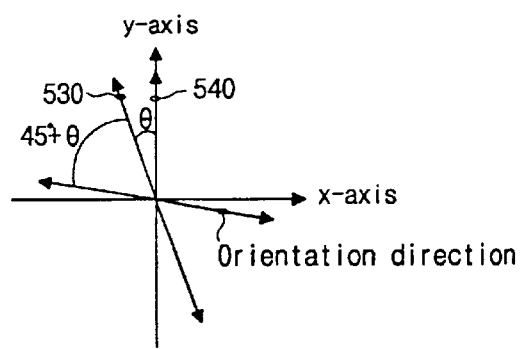
Figure 10A:
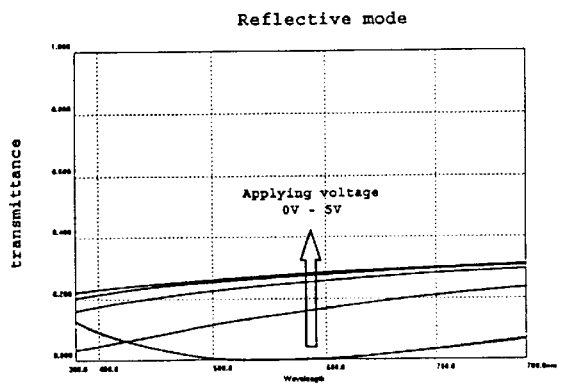
FIGS. 10A to 13B are graphs illustrating a light transmittance of the transflective LCD device with respect to wavelengths of the light when applying the voltage to liquid crystal layer, and respectively show the transmittance with respect to the value of the angle "θ" of FIGS. 9A and 9B.
Figure 10B:
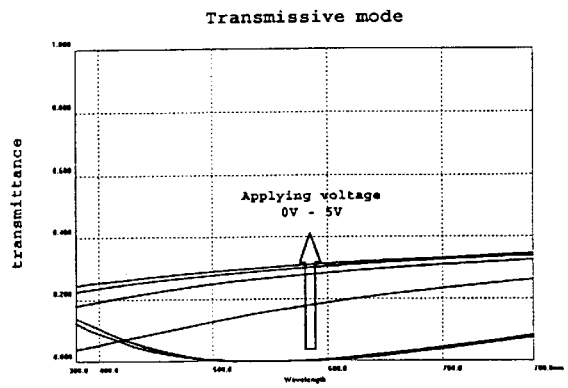
Figure 11A:
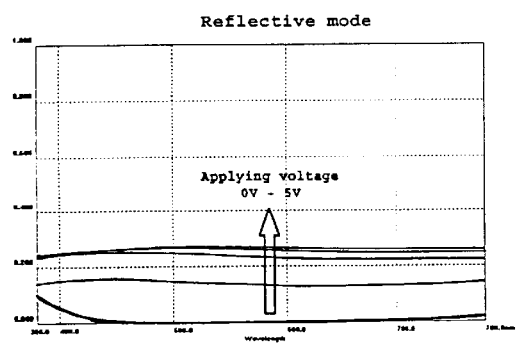
Figure 11B:
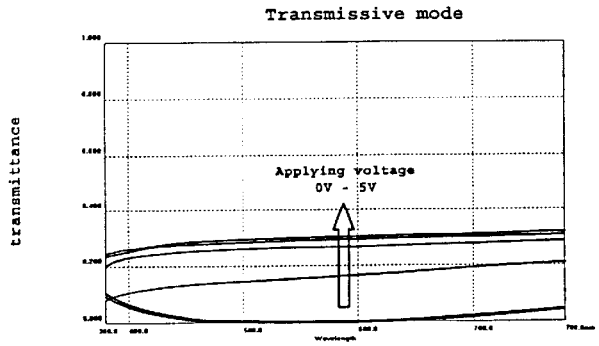
Figure 12A:
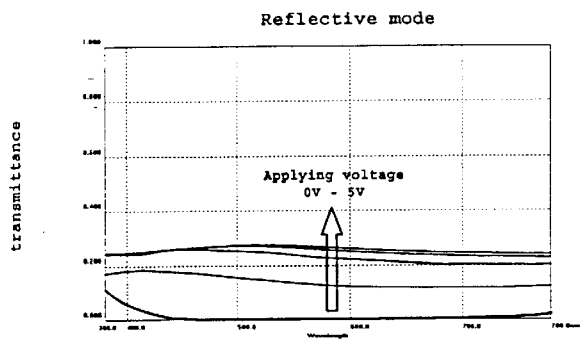
Figure 12B:
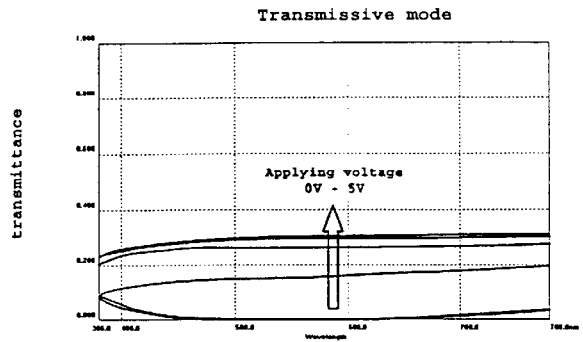
Figure 13A:
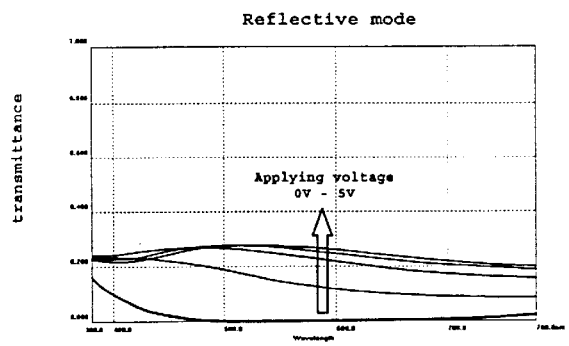
Figure 13B:
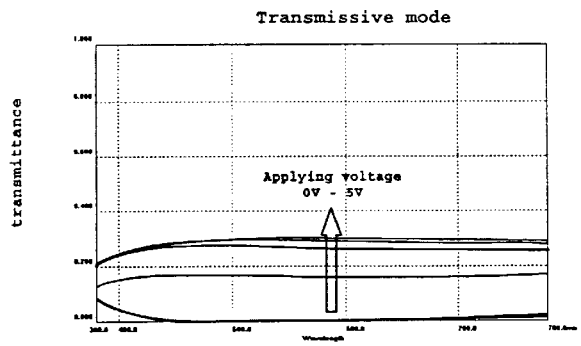

FIGS. 9A and 9B show a positional relationship of the LCD device elements of FIG. 6 according to another embodiment. FIG. 9A shows a positional relationship of the elements of FIG. 6 in the transmissive mode, and FIG. 9B shows a positional relationship in the reflective mode.

Referring to FIG. 9A, a transmissive axis of the upper polarizer 540 is parallel with the y-axis. The slow axis of the HWP 530 is disposed at an angle "θ" from that of the upper polarizer 540. The transmissive axis of the lower polarizer 410 is disposed at the angle "2θ" from that of the upper polarizer 540. The orientation direction of the liquid crystal, which determines the arrangement of the liquid crystal molecules, is 45° from the transmissive axis of the lower polarizer 410.

FIG. 9B shows a positional relationship of the axes of the LCD device elements in the reflective mode. As shown, the transmissive axis of the lower polarizer 410 is not depicted due to the fact that the lower polarizer 410 does not affect the state of the light in the reflective mode. The transmissive axis of the upper polarizer 540 is parallel with the y-axis and the slow axis of the HWP 530 is disposed at the angle "θ" from that of the upper polarizer 540. Thus, the orientation direction of the liquid crystal is "45°+θ" from the slow axis of the HWP 530.

As aforementioned and referring to FIGS. 9A and 9B, the transmissive axis of the upper polarizer 540 is not perpendicular to that of the lower polarizer 410. Namely, the angle "2θ" represents the angle between the transmissive axis of the upper polarizer and that of the lower polarizer.

FIGS. 10A to 13B are graphs illustrating a light transmittance of the transflective LCD device with respect to wavelengths of the light when applying the voltage to liquid crystal layer, and respectively show the transmittance with respect to the value of the angle "θ" of FIGS. 9A and 9B. Namely, the graphs show the switching ability of the transflective LCD device according to the angle "θ" that is given 0°, 10°, 12.5° and 17.5° while applying voltages.

Referring to FIGS. 10A to 13B, the angle "θ", which is the slow axis angle of the HWP, varies considerably from 0° to 17.5°. Each line in the graphs represents a gradient when the voltage is applied and varies from 0V to 5V. When the angle "θ" is 10°, i.e., the slow axis angle of the HWP as shown in FIGS. 11A and 11B, the transmissive axis angle of the lower polarizer 410 is 20° from the transmissive axis of the upper polarizer and the liquid crystal has the orientation direction 55° from the slow axis of the HWP. At this time, the switching ability of the transflective LCD device is most stable in the reflective mode. Namely, the switching ability to the broad-band wavelengths in the reflective mode tends to be stable when the angle "θ" increases from 0° to 10°. However, the switching ability to the broad-band wavelengths except the green wavelength band (centered at 550 nm) tends to decline when the angle "θ" increases from 12.5° to 17.5°, and thus the transmittance decreases.

In addition, in the transmissive mode, the switching ability to the blue wavelength band (centered at 430 nm) becomes increasing when the angle "θ" increases from 0° to 17.5°. The switching ability in the transmissive mode of the transflective LCD device is most stable when the angle "θ" is 17.5°.

As described above, the most stable and efficient value of the angle "θ" is different in both the reflective and transmissive modes of the transflective LCD device. However, for the purpose of satisfying both the reflective and transmissive mode, the angle "θ" is approximately about 12.5°. This re-arrangement of the optical directions of the LCD device elements is not exclusively used in the first embodiment. Namely, this re-arrangement can be used in a reflective LCD device or in a transmissive LCD device, respectively. If the transmissive LCD device adopts the re-arrangement described above, the angle "θ" is beneficially about 17.5°. If the reflective LCD device adopts this re-arrangement described above, the angle "θ" is approximately 10°.

Figure 14:
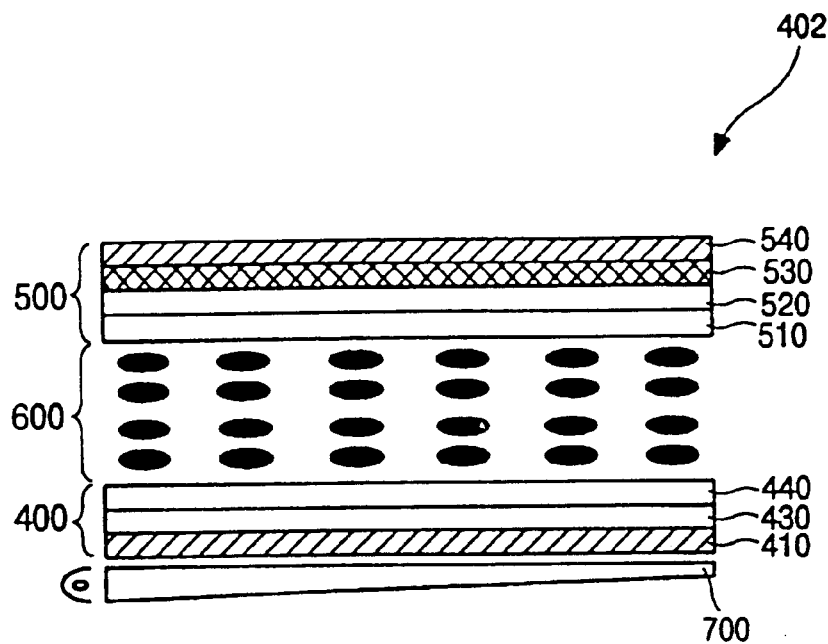
FIG. 14 is a cross-sectional view of a transmissive LCD device according to a preferred embodiment.

FIG. 14 is a cross-sectional view of a transmissive LCD device according to a preferred embodiment. The color filters are not depicted in FIG. 14 because it does not affect the polarization state of the light. As shown, the transmissive LCD device 402 is widely divided into a backlight device 700, an array substrate 400, a liquid crystal layer 600, and a color filter substrate 500. The liquid crystal layer 600 is interposed between the array substrate 400 and the color filter substrate 500. The backlight device 700 is arranged under the lower substrate 400 and emits light into the liquid crystal layer 600.

The array substrate 400 includes a lower transparent substrate 430, a lower polarizer 410 and a transparent conductive electrode 440. On the surface of the lower substrate 430, which faces the upper substrate 500, are a TFT (not shown) and the transparent conductive electrode 440 as a pixel electrode. An alignment layer can be on the transparent conductive electrode 440. On the other surface of the first substrate 430 is the lower polarizer 410.

The color filter substrate 500 includes a transparent common electrode 510, an upper transparent substrate 520, a half wave plate (HWP; λ/2) 530 and an upper polarizer 540. On one surface of the upper transparent substrate 520 is the HWP 530 as a retardation film. On the HWP 530 is the upper linear polarizer 540. The common electrode 510 is formed on the other surface of the second substrate 520 facing the array substrate 400. An alignment film can be formed on the common electrode 510. The above-mentioned half wave film (HWP) 530 substitutes for the pair of retardation films of the conventional LCD device. Also, the HWP 530 acts as a retarder and causes phase difference of λ/2.

Figure 15:
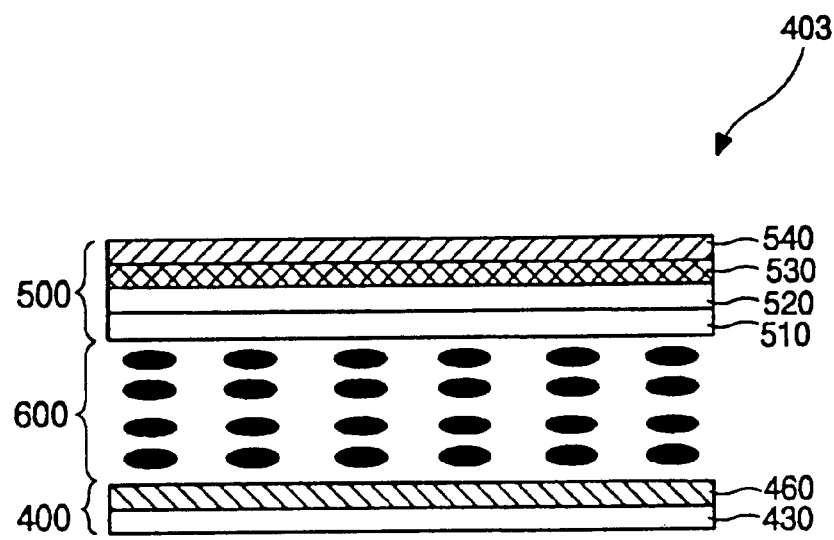
FIG. 15 is a cross-sectional view of a reflective LCD device according to a preferred embodiment.

FIG. 15 is a cross-sectional view of a reflective LCD device according to a preferred embodiment. The color filters are not depicted in FIG. 15 because it does not affect the polarization state of the light. As shown, the reflective LCD device 403 is widely divided into an array substrate 400, a liquid crystal layer 600, and a color filter substrate 500. The liquid crystal layer 600 is interposed between the array substrate 400 and the color filter substrate 500.

The array substrate 400 includes a lower transparent substrate 430 and a reflective electrode 460. On the surface of the lower substrate 430, which faces the upper substrate 500, are a TFT (not shown) and the reflective electrode 460 as a pixel electrode. An alignment layer can be formed on the reflective electrode 460 although not depicted.

The color filter substrate 500 includes a transparent common electrode 510, an upper transparent substrate 520, a half wave plate (HWP; λ/2) 530 and an upper polarizer 540. On one surface of the upper transparent substrate 520 is the HWP 530. On the HWP 530 is the upper linear polarizer 540. The common electrode 510 is formed on the other surface of the second substrate 520 facing the array substrate 400. The above-mentioned half wave film (HWP) 530 substitutes for the pair of retardation films of the conventional LCD device. And the HWP 530 acts as a retarder and causes phase difference of λ/2. Although not explicitly shown, an alignment layer can be formed on the common electrode 510.

As depicted and mentioned hereinbefore, the efficiency in the use of the light from the backlight device is maximized in the transmissive mode when fabricating the transflective LCD device that is designed greater focusing in the reflective mode according to an embodiment of the present invention. Moreover, it is another advantage that the transflective LCD device according to an embodiment of the present invention can uniformly control the broad-band wavelengths of the visible ray.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A transflective liquid crystal display (LCD) device, comprising:
   first and second substrates facing and spaced apart from each other;
   a first polarizer formed under the first substrate;
   a half wave plate and a second polarizer that are formed in series on the second substrate;

a backlight device being adjacent to the first polarizer;

a common electrode on a surface of the second substrate facing the first substrate;

a pixel electrode formed on the first substrate and corresponding to each pixel, the pixel electrode is divided into a transmissive portion and a reflective portion;

a liquid crystal layer interposed between the first and second substrates, wherein a thickness of the liquid crystal layer between the common electrode and the transmissive portion of the pixel electrode is more than 1.5 and less than 2.5 times larger than a thickness of the liquid crystal layer between the common electrode and the reflective portion of the pixel electrode; and, within a range of about 10 degrees to 17.5 degrees wherein a slow axis of the half wave plate is disposed at an angle "θ" from a transmissive axis of the second polarizer; and wherein a transmissive axis of the first polarizer is disposed at the angle "2θ" from the transmissive axis of the second polarizer.

2. The transflective LCD device according to claim 1, further comprising alignment layers formed between the liquid crystal layer and the first and second substrates.

3. The transflective LCD device according to claim 1, wherein the common electrode is transparent.

4. The transflective LCD device according to claim 1, wherein molecules of the liquid crystal layer are arranged in a horizontal direction when a voltage is not applied to the common and pixel electrodes.

5. The transflective LCD device according to claim 4, wherein an orientation direction of the liquid crystal layer is disposed at an angle "2θ+45°" from the transmissive axis of the second polarizer.

6. The transflective LCD device according to claim 4, wherein an optical retardation of the liquid crystal layer between the common electrode and the transmissive portion of the pixel electrode ranges from 250 nm to 300 nm.

7. The transflective LCD device according to claim 4, wherein an optical retardation of the liquid crystal layer between the common electrode and the reflective portion of the pixel electrode ranges from 110 nm to 160 nm.

8. The transflective LCD device according to claim 1, wherein molecules of the liquid crystal layer are arranged in a vertical direction when a voltage is not applied to the common and pixel electrodes.

9. The transflective LCD device according to claim 8, wherein the molecules of the liquid crystal layer are arranged in a horizontal direction when the voltage is applied to the common and pixel electrodes.

10. The transflective LCD device according to claim 8, wherein an orientation direction of the liquid crystal layer is disposed at an angle "2θ+45°" from the transmissive axis of the second polarizer.

11. The transflective LCD device according to claim 8, wherein an optical retardation of the liquid crystal layer between the common electrode and the transmissive portion of the pixel electrode ranges from 250 nm to 300 nm.

12. The transflective LCD device according to claim 8, wherein an optical retardation of the liquid crystal layer between the common electrode and the reflective portion of the pixel electrode ranges from 110 nm to 160 nm.

13. The transflective LCD device according to claim 1, wherein an optical retardation of the half wave plate ranges from 250 nm to 300 nm.

14. The transflective LCD device according to claim 1, wherein the angle "θ" ranges from 10° to 15°.

* * * * *